US010633267B2

(12) United States Patent
Frankel et al.

(10) Patent No.: US 10,633,267 B2
(45) Date of Patent: Apr. 28, 2020

(54) FINE BUBBLE DIFFUSER ASSEMBLY

(71) Applicants: Thomas E. Frankel, Poughkeepsie, NY (US); Seoungil Kang, Poughkeepsie, NY (US); Todd D. Ritter, Poughkeepsie, NY (US)

(72) Inventors: Thomas E. Frankel, Poughkeepsie, NY (US); Seoungil Kang, Poughkeepsie, NY (US); Todd D. Ritter, Poughkeepsie, NY (US)

(*) Notice: Subject to any disclaimer, the term of this patent is extended or adjusted under 35 U.S.C. 154(b) by 250 days.

(21) Appl. No.: 15/008,099

(22) Filed: Jan. 27, 2016

(65) Prior Publication Data

US 2017/0210652 A1 Jul. 27, 2017

(51) Int. Cl.
*C02F 3/20* (2006.01)
*B29C 45/14* (2006.01)
(Continued)

(52) U.S. Cl.
CPC .......... *C02F 3/201* (2013.01); *B01F 3/04269* (2013.01); *B29C 45/00* (2013.01);
(Continued)

(58) Field of Classification Search
CPC .. B01F 2003/04177; B01F 2003/04297; B01F 3/04269; B01F 2003/04276; B01F 2003/04361; C02F 3/201; B29C 45/2628; B29C 45/14377; B29C 45/14; B29C 45/00; B29C 2045/14442; B29C 45/14065;
(Continued)

(56) References Cited

U.S. PATENT DOCUMENTS 1,759,983 A * 5/1930 Houston .................. B03D 1/26
                                                      261/122.2
4,288,394 A * 9/1981 Ewing ................. B01F 3/04262
                                                      137/852
(Continued)

FOREIGN PATENT DOCUMENTS

DE   101 19 013 A1 * 10/2002
DE      10119013 A1   10/2002
(Continued)

OTHER PUBLICATIONS

EPO translation of Depmeyer DE 101 19 013 A1 published Oct. 31, 2002.*
(Continued)

*Primary Examiner* — Stephen Hobson
(74) *Attorney, Agent, or Firm* — Law Offices of Michael L. Wise, LLC

(57) ABSTRACT

A diffuser assembly includes a flexible diffuser membrane and a diffuser body. The flexible diffuser membrane defines a circumferential bead. The diffuser body defines a circular plate underlying the flexible diffuser membrane, and an edge ring covering a covered portion of the circumferential bead. The edge ring defines an inside surface that conforms to an outside shape of the covered portion of the circumferential bead. The edge ring is integral to the diffuser body. Such a diffuser assembly may provide a disposable diffuser assembly option with many advantages over conventional technologies such as improved ease of installation, lower weight, and lower cost.

25 Claims, 8 Drawing Sheets

(51) Int. Cl.
  *B29C 45/26* (2006.01)
  *B01F 3/04* (2006.01)
  *B29C 45/00* (2006.01)
  B29L 31/00 (2006.01)
  B29L 9/00 (2006.01)
  B29K 101/12 (2006.01)
  B29K 623/00 (2006.01)
  B29L 1/00 (2006.01)

(52) U.S. Cl.
  CPC ........ *B29C 45/14* (2013.01); *B29C 45/14065* (2013.01); *B29C 45/14377* (2013.01); *B29C 45/2628* (2013.01); *B01F 2003/04276* (2013.01); *B01F 2003/04297* (2013.01); *B01F 2003/04361* (2013.01); *B29C 2045/14147* (2013.01); *B29C 2045/14442* (2013.01); *B29K 2101/12* (2013.01); *B29K 2623/16* (2013.01); *B29L 2001/00* (2013.01); *B29L 2009/001* (2013.01); *B29L 2031/737* (2013.01); *B29L 2031/755* (2013.01); *Y02W 10/15* (2015.05)

(58) Field of Classification Search
  CPC .......... B29C 2045/14147; Y02W 10/15; B29L 2009/001; B29L 2031/737; B29L 2031/755; B29L 2001/00; B29K 2101/12; B29K 2623/16
  See application file for complete search history.

(56) References Cited

U.S. PATENT DOCUMENTS

| | | | | |
|---|---|---|---|---|
| 4,569,805 A * | 2/1986 | Hume | ................. | B01F 3/04262 261/122.1 |
| 4,629,126 A * | 12/1986 | Goudy, Jr. | .......... | B01F 3/04269 239/452 |
| 4,865,778 A * | 9/1989 | Leidel | ................. | B01F 3/04262 261/122.1 |
| 5,330,688 A * | 7/1994 | Downs | ................. | B01F 3/0412 261/122.1 |
| 5,422,043 A * | 6/1995 | Burris | ..................... | A61L 2/202 261/122.1 |
| 5,762,835 A * | 6/1998 | Bassfeld | ............ | B01F 3/04269 261/122.1 |
| 5,858,283 A * | 1/1999 | Burris | ................. | B01F 3/04269 156/290 |
| 6,244,574 B1 * | 6/2001 | Downs | ................. | B01F 3/0412 261/122.1 |
| 6,367,783 B1 * | 4/2002 | Raftis | ................. | B01F 3/04269 261/122.1 |
| 6,464,211 B1 * | 10/2002 | Downs | ................. | B01F 3/04241 261/122.1 |
| 6,811,148 B2 * | 11/2004 | Frankel | ................. | B01F 3/0412 261/122.1 |
| 6,889,964 B2 * | 5/2005 | Way | ...................... | B01F 3/0412 261/122.1 |
| 7,141,203 B2 * | 11/2006 | Way | ...................... | B01F 3/0412 264/610 |
| 7,681,867 B2 * | 3/2010 | Hu | ...................... | B01F 3/04269 261/122.1 |
| 8,061,689 B2 * | 11/2011 | Tharp | ................... | B01F 3/0412 261/122.1 |
| 8,657,268 B2 * | 2/2014 | Smiltneek | ............ | B01F 3/0412 210/758 |
| 9,579,611 B2 * | 2/2017 | Berfner | ................. | B01F 3/0412 |
| 2005/0046054 A1 | 3/2005 | Way et al. | | |
| 2010/0133709 A1 * | 6/2010 | Hu | ...................... | B01F 3/04269 261/122.2 |
| 2013/0093106 A1 * | 4/2013 | Hoefken | ............... | B01F 3/0412 261/64.1 |
| 2014/0087457 A1 * | 3/2014 | Goodwin | ............ | B01F 3/04269 435/325 |
| 2015/0246835 A1 * | 9/2015 | Ko | .......................... | C02F 3/201 210/151 |

FOREIGN PATENT DOCUMENTS

| | | | | |
|---|---|---|---|---|
| EP | 0704237 A2 | 4/1996 | | |
| WO | 2006116067 A1 | 11/2006 | | |
| WO | WO-2010028821 A1 * | 3/2010 | .......... | B01F 3/04269 |
| WO | 2012063995 A1 | 5/2012 | | |
| WO | WO-2012063995 A1 * | 5/2012 | ............. | C02F 3/208 |

OTHER PUBLICATIONS

Vaccaro "Guidelines for Choosing A Pipe Thread Sealant" Plant Engineering (Year: 1998).*
EPO translation of WO2010028821 (Year: 2010).*
EPO translation of Bae WO 2012/063995 dated May 18, 2012 (Year: 2012).*
"Elastomer" Wikipedia published Jul. 7, 2011 accessed at <https://en.wikipedia.org/w/index.php?title=Elastomer&oldid=438254792> (Year: 2011).*
"Thermoplastic" Wikipedia published Dec. 19, 2014 accessed at <https://en.wikipedia.org/w/index.php?title=Thermoplastic&oldid=638764548> (Year: 2014).*

* cited by examiner

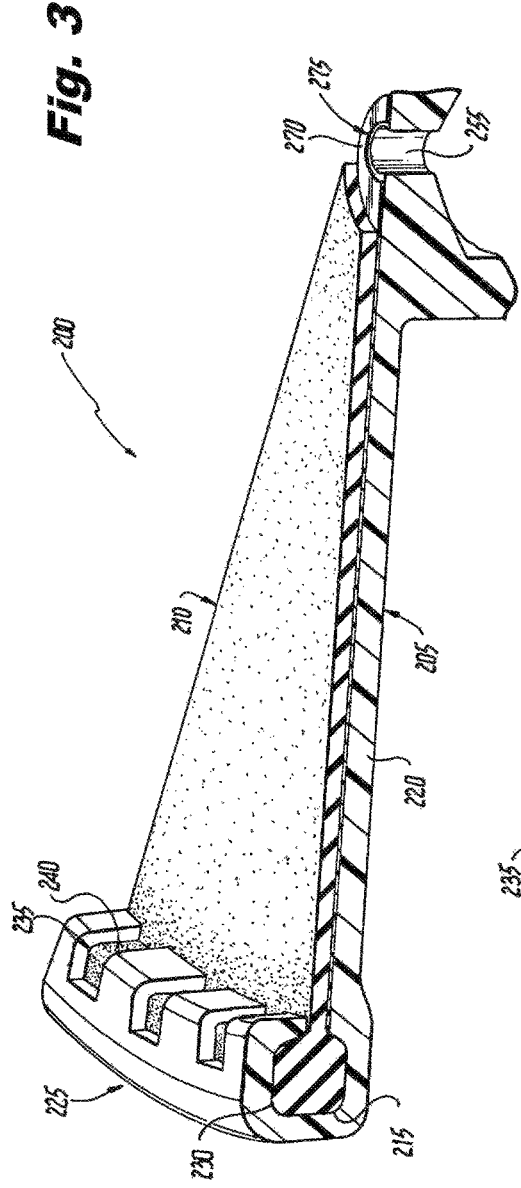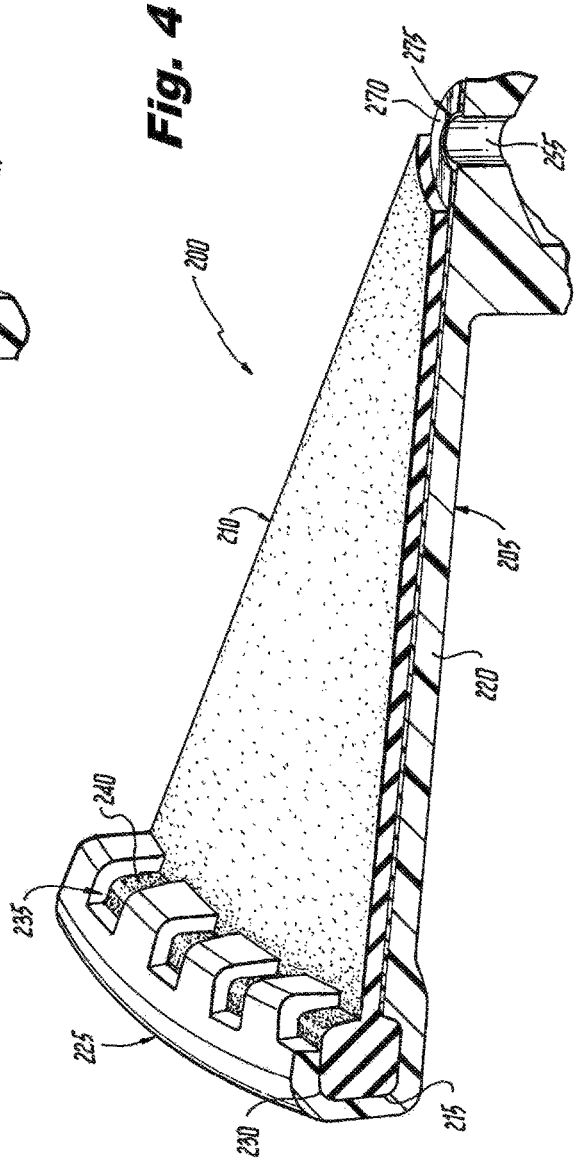

FINE BUBBLE DIFFUSER ASSEMBLY

FIELD OF THE INVENTION

The present invention relates generally to wastewater treatment, and, more particularly, to fine bubble diffuser assemblies for use in wastewater treatment.

BACKGROUND OF THE INVENTION

Flexible diffusers are conventionally used to support aerobic biological processes in wastewater treatment plants. A flexible diffuser typically comprises a disc-, tube-, or strip-shaped membrane that is constructed of rubber or other similar materials, which is punctured to provide a number of perforations in the form of holes or slits. In operation, pressurized air is sent through these perforations to create a plume of small bubbles. The bubbles rise through the wastewater and provide the surrounding wastewater with the oxygen needed to sustain the desired biological processes occurring therein.

FIG. 1 shows a partially-broken side perspective view of a fine bubble diffuser assembly 100 that is conventionally used in modern wastewater treatment facilities for "submerged" treatment of the wastewater. Wastewater treatment with such assemblies is described in, as just one example, F. L. Burton, *Wastewater Engineering* (McGraw-Hill College, 2002), which is hereby incorporated by reference herein. When in use, a plurality of diffuser assemblies is arrayed on several lateral distribution pipes that cross a wastewater treatment tank. Diffuser assemblies may, for example, be placed every foot along a given lateral distribution pipe. A blower located near the tank sends compressed air to the lateral distribution pipe via several support pipes (e.g., drop pipes and manifold pipes).

In the diffuser assembly 100, a flexible diffuser membrane 110 sits atop a diffuser body 120. The diffuser body 120 comprises a threaded mating tube 130, an air inlet orifice 140, and a receiving surface 150 for coupling to a retainer ring 160. The retainer ring 160 holds the flexible diffuser membrane 110 against the diffuser body 120. When gas is applied to the flexible diffuser membrane 110 through the air inlet orifice 140, the gas pressure expands the flexible diffuser membrane 110 away from the diffuser body 120, and causes the membrane's perforations to open so that the gas discharges through them in the form of fine bubbles. When the gas pressure is relieved, the flexible diffuser membrane 110 collapses on the diffuser body 120 to close the perforations and prevent the liquid from entering the diffuser body 120 in the opposite direction. Generally, a flexible diffuser membrane 110 configured in this way produces bubbles smaller than five millimeters in diameter. The resultant large ratio of surface area to volume in these bubbles promotes efficient oxygen mass transfer between the bubbles and the surrounding wastewater. The fine bubbles also cause an upward movement in the wastewater treatment tank, which helps to keep solid waste in suspension and to mix the contents of the tank.

Diffuser assemblies that include threaded mating tubes, like the diffuser assembly 100, remain relatively popular because they may be readily attached to and detached from a gas distribution pipe via their threaded mating tubes in order to be serviced. Nevertheless, servicing such devices still remains relatively labor intensive, and generally requires the use of skilled labor. In order to change a diffuser membrane on a conventional threaded diffuser assembly like the diffuser assembly 100, for example, the diffuser assembly must be placed on a fixture after being removed from its gas distribution pipe, and the diffuser assembly's retainer ring removed to allow its diffuser membrane to be lifted away. A new diffuser membrane must then be put in its place, and the retainer ring re-greased and re-applied to the correct torque value. In many cases, the retainer ring must also be replaced due to damage. Only then may the completed diffuser assembly be removed from the fixture and re-mounted to its gas distribution pipe, again to the correct torque value.

There is as a result a need for alternative diffuser assemblies that address some of the above-identified deficiencies.

SUMMARY OF THE INVENTION

Embodiments of the present invention address the above-identified needs by providing a diffuser assembly with a flexible diffuser membrane that is captured by the diffuser body utilizing an integral edge ring that cannot be separated from the remainder of the diffuser body. Such a diffuser assembly may provide a disposable diffuser assembly option with many advantages over conventional technologies, such as improved ease of installation, lower weight, and lower cost.

Aspects of the invention are directed to a diffuser assembly comprising a flexible diffuser membrane and a diffuser body. The flexible diffuser membrane defines a circumferential bead. The diffuser body defines a circular plate underlying the flexible diffuser membrane, and an edge ring covering a covered portion of the circumferential bead. The edge ring defines an inside surface that conforms to an outside shape of the covered portion of the circumferential bead. The edge ring is integral to the diffuser body.

Additional aspects of the invention are directed to a wastewater treatment system comprising a diffuser assembly meeting the limitations of the paragraph immediately above.

Finally, even additional aspects of the invention are directed to a method of manufacturing a diffuser assembly. A flexible diffuser membrane is received that defines a circumferential bead. A diffuser body is formed at least in part by injection molding defining a circular plate underlying the flexible diffuser membrane, and an edge ring covering a covered portion of the circumferential bead. The edge ring defines an inside surface that conforms to an outside shape of the covered portion of the circumferential bead. The edge ring is integral to the diffuser body.

BRIEF DESCRIPTION OF THE DRAWINGS

These and other features, aspects, and advantages of the present invention will become better understood with regard to the following description, appended claims, and accompanying drawings where:

FIGS. 3 and 4 show perspective sectional views of portions of a representative diffuser assembly along the planes indicated in FIG. 2;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, an element is "not substantially compressed" by something else if the element's volume is not modified by more than ten percent. The term "directly" means without any intervening elements. Lastly, a feature defined by an element is "integral" to that element if the feature cannot be separated from the remainder of that element without cutting, breaking, melting, or otherwise damaging the element.

Figure 2:
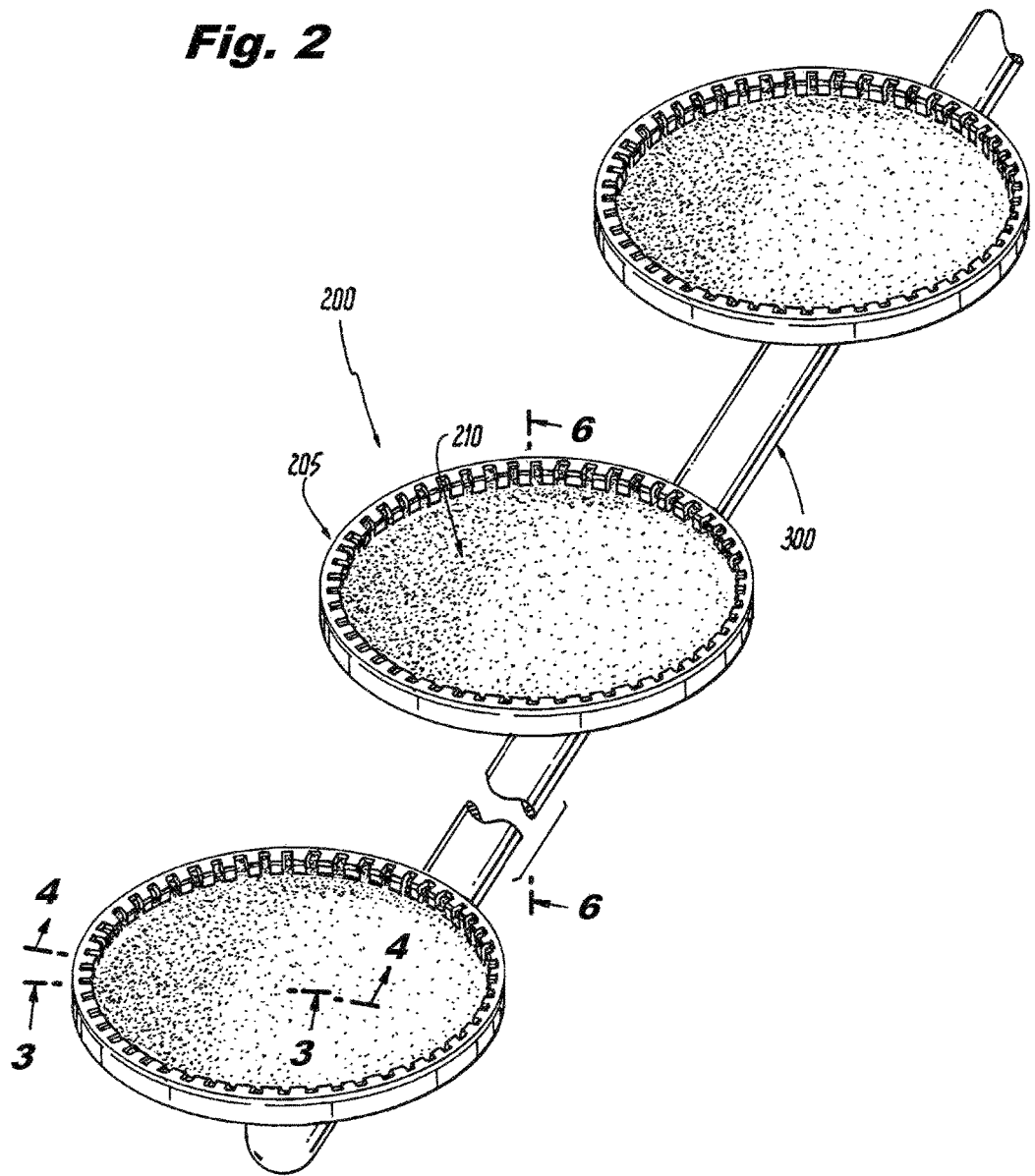
FIG. 2 shows a perspective view of three diffuser assemblies in accordance with an illustrative embodiment of the invention attached to a gas distribution pipe.

FIG. 2 shows a perspective view of three diffuser assemblies 200 in accordance with an illustrative embodiment of the invention with the diffuser assemblies 200 attached to a gas distribution pipe 300. Each of the diffuser assemblies 200 comprises a respective diffuser body 205, which supports a respective flexible diffuser membrane 210. The diffuser assemblies 200 and the gas distribution pipe 300 may be placed at the bottom of a wastewater treatment tank. The gas distribution pipe 300 may then be caused to supply a gas (e.g., air) to the diffuser assemblies 200 so as to cause the diffuser assemblies 200 to release bubbles into the surrounding wastewater.

Figure 5:
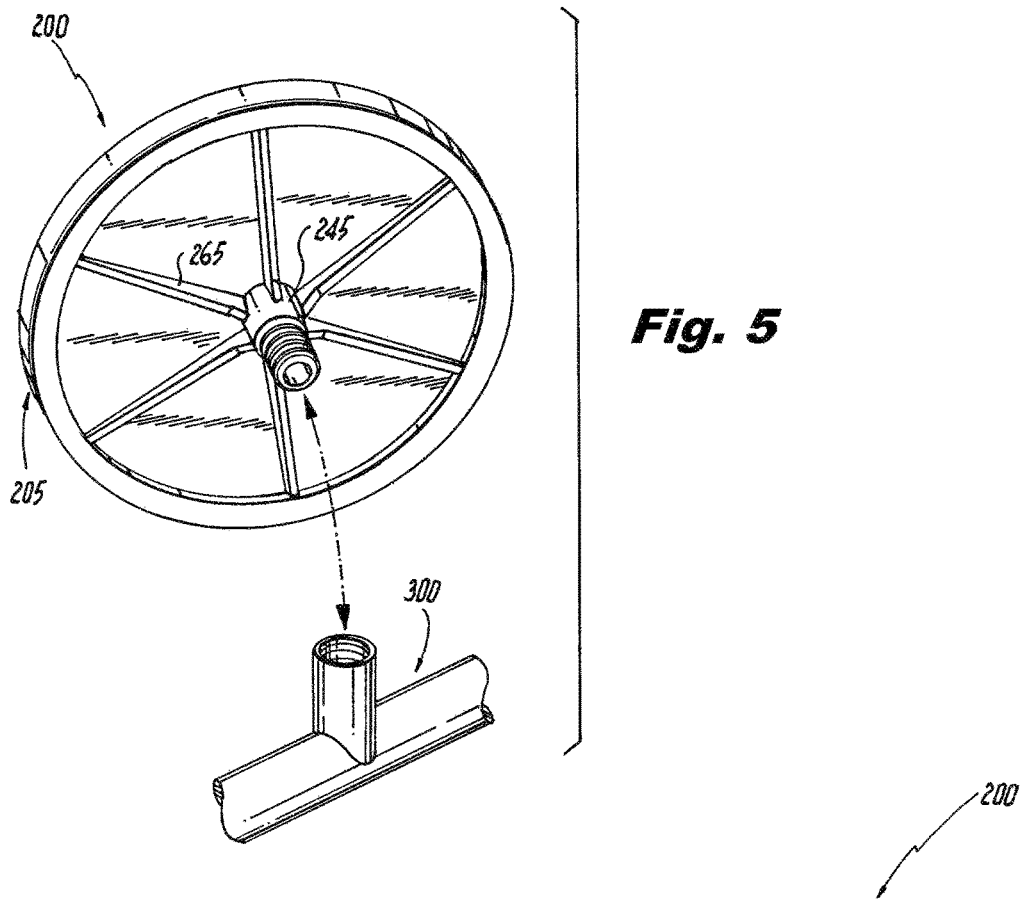
FIG. 5 shows an exploded perspective view of the underside of the diffuser assembly in relation to the gas distribution pipe.
Figure 6:
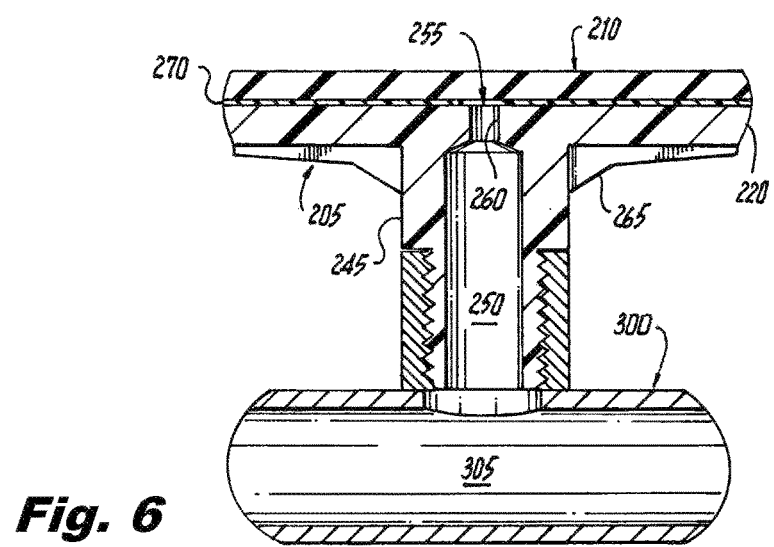
FIG. 6 shows a sectional view of portions of the diffuser assembly and the gas distribution pipe along the plane indicated in FIG. 2.

Additional details of a representative one of the diffuser assemblies 200 are shown in FIGS. 2-6. FIGS. 3 and 4 show perspective sectional views of respective portions of the diffuser assembly 200 along the planes indicated in FIG. 2, while FIG. 5 shows an exploded perspective view of the underside of the diffuser assembly 200 in relation to the gas distribution pipe 300. Finally, FIG. 6 shows a sectional view of portions of the diffuser assembly 200 and the gas distribution pipe 300 along the plane indicated in FIG. 2.

The flexible diffuser membrane 210 is disk-shaped and defines a circumferential bead 215. In the present illustrative embodiment, the circumferential bead 215 has a square cross-section with rounded corners. A plurality of perforations penetrate the flexible diffuser membrane 210 except in an intact region at the center of the flexible diffuser membrane 210 (further described and labeled below). The diffuser body 205 defines a circular plate 220 that underlies the flexible diffuser membrane 210, as well as an edge ring 225 covering a portion of the circumferential bead 215 of the flexible diffuser membrane 210 (hereinafter, the "covered portion" of the circumferential bead 215). The covered portion consists of a majority of the circumferential bead 215.

The edge ring 225 acts to retain the flexible diffuser membrane 210 to the diffuser body 205. The edge ring 225 defines an inside surface 230 that conforms to an outside shape of the covered portion of the circumferential bead 215 without significantly compressing the circumferential bead 215. In so doing, the edge ring 225 defines a plurality of slots 235 therein, each slot 235 exposing a respective outside surface portion 240 of the circumferential bead 215. At the same time, the edge ring 225 is integral to the diffuser body 205, meaning that the edge ring 225 cannot be removed from the remainder of the diffuser body 205 without cutting, breaking, melting, or otherwise damaging the diffuser body 205. This clearly differs from the conventional diffuser assembly 100 in FIG. 1, where the retainer ring 160 is distinct from the diffuser body 120 and is removably threaded onto the receiving surface 150 of the diffuser body 120.

The diffuser body 205 further describes a threaded mating tube 245 with an inside gas passage 250 that terminates in an opening 255 in the circular plate 220. With the diffuser assembly 200 mounted to the gas distribution pipe 300 in the manner indicated, the inside gas passage 250 is in gaseous communication with an inside 305 of the gas distribution pipe 300. The inside gas passage 250 necks down as it approaches the opening 255 in the circular plate 220, forming an orifice 260. The size of this orifice 260 may be tailored to the specific application. Several ribs 265 on the bottom of the diffuser body 205 lend additional strength to the diffuser body 205.

Still referring to FIGS. 2-6, it will be noted that a thin circular sheet 270 is disposed between the flexible diffuser membrane 210 and the circular plate 220 of the diffuser body 205. The thin circular sheet 270 includes a center hole 275 that overlies the opening 255 in the circular plate 220. As will be explained in further detail below, the integral nature of the edge ring 225 as well as the conformity of the inside surface 230 of the edge ring 225 with respect to the covered portion of the circumferential bead 215 may be obtained by injection molding the diffuser body 205 around the flexible diffuser membrane 210. The thin circular sheet 270 aids in this process.

Figure 7:
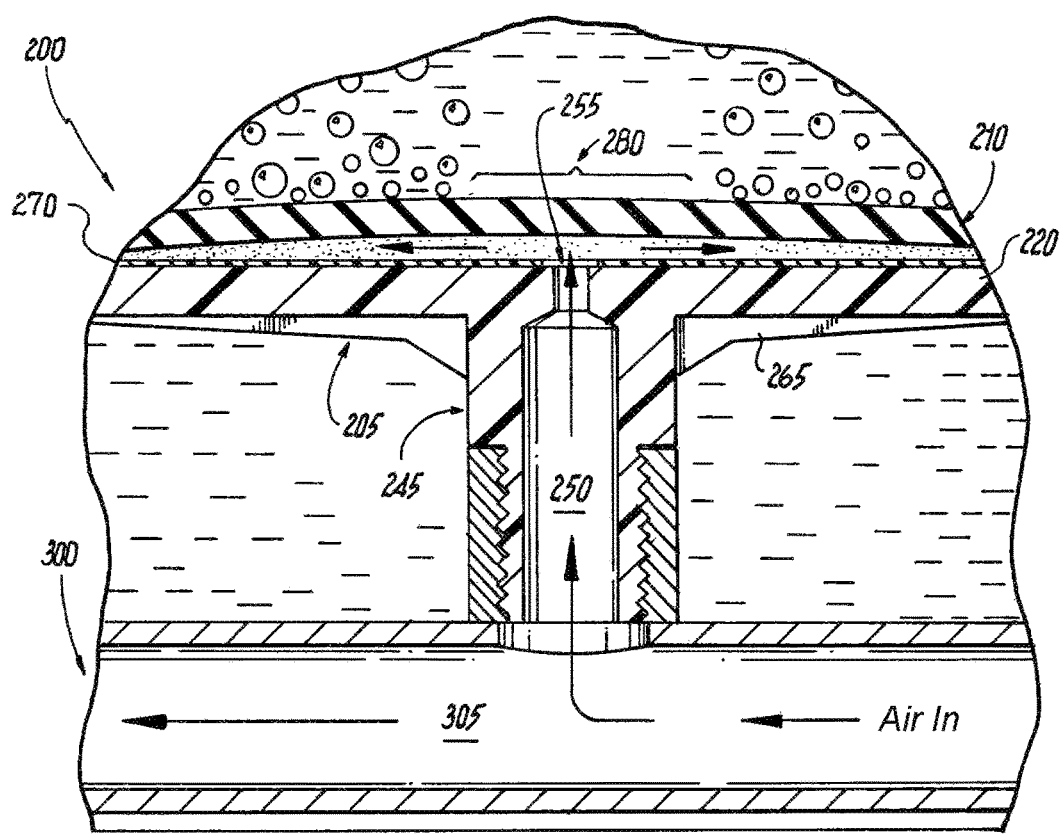
FIG. 7 shows a sectional view of portions of the diffuser assembly and the gas distribution pipe with pressurized gas being supplied to the diffuser assembly.

FIG. 7 shows a sectional view of respective portions of the diffuser assembly 200 and the gas distribution pipe 300 along the plane indicated in FIG. 2, but in a condition wherein pressurized gas (in this case, air) is being supplied to the diffuser assembly 200 via the gas distribution pipe 300. The gas pressure expands the flexible diffuser membrane 210 away from the diffuser body 205 and causes the gas to discharge from the perforations of the flexible diffuser membrane 210 as fine bubbles. An intact region 280 of the flexible diffuser membrane 210, which is devoid of perforations, sits above the opening 255 in the circular plate 220. This intact region 280 allows the diffuser assembly to act as a check valve and prevent wastewater from flooding the gas distribution pipe 300 when the pressurized gas is turned off. When the gas pressure is shut off, the flexible diffuser membrane 210 collapses back onto the diffuser body 205 both in response to the natural tendency of the flexible diffuser membrane 210 to return to a relaxed, un-stretched shape and in response to the weight of the surrounding wastewater. So relaxed, the condition shown in FIG. 6 is recreated. With the flexible diffuser membrane 210 positioned as in FIG. 6, the intact region 280 of the flexible diffuser membrane 210 overlies the opening 255 and prevents wastewater from entering the inside gas passage 250 in the opposite direction.

The flexible diffuser membrane 210 may comprise an elastomer such as, but not limited to, ethylene propylene diene monomer (EPDM). One or both sides of the flexible diffuser membrane 210 may be covered in a fluoroelastomer such as, for example, polytetrafluoroethylene (PTFE), or the flexible diffuser membrane 210 may be impregnated with fluorine. Both PTFE coatings and fluorine impregnation have been demonstrated to reduce the rate at which diffuser membranes are fouled. The diffuser body 205 may comprise an injection-moldable thermoplastic such as, for example, polypropylene, acrylonitrile butadiene styrene, polyvinyl chloride, and polyoxymethylene. The thin circular sheet 270 may also comprise a plastic; in a preferred embodiment, the thin circular sheet 270 is formed of the same plastic as the diffuser body 205.

As indicated above, the diffuser assembly 200 may be formed by injection molding the diffuser body 205 around the flexible diffuser membrane 210 utilizing several molding parts. General aspects of injection molding will already be familiar to one having ordinary skill in the relevant arts, and are also described in several readily accessible publications including, as just one example, D. V. Rosatto et al., *Injection Molding Handbook* (Springer Science & Business Media, 2012), which is hereby incorporated by reference herein. A partially broken, exploded, perspective view of the molding parts in relation to elements of the diffuser assembly 200 is shown in FIG. 8, while FIG. 9 shows a perspective view of the molding parts closed about the same diffuser assembly elements in a condition prior to the injection of any molten plastic.

Figure 8:
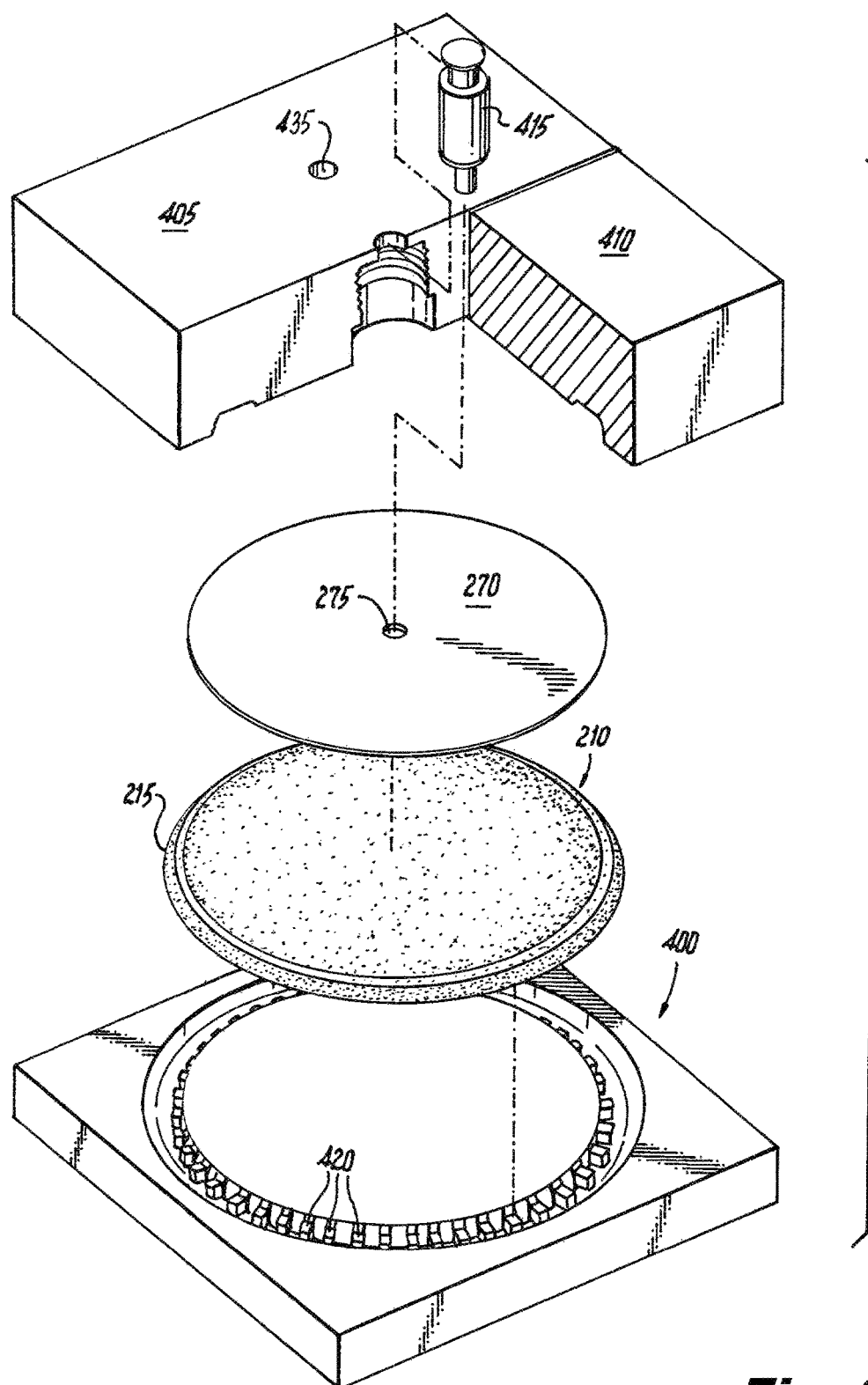
FIG. 8 shows a partially-broken exploded perspective view of molding parts in relation to elements of the diffuser assembly.
Figure 9:
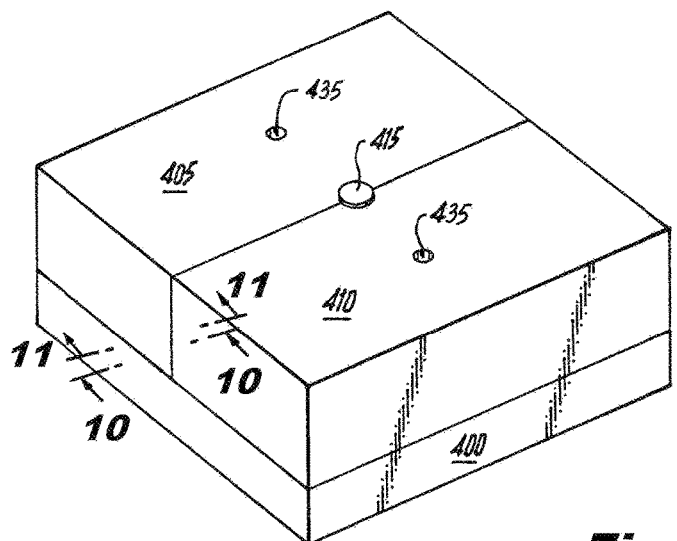
FIG. 9 shows a perspective view of the molding parts closed about the diffuser assembly elements.

In order to allow gravity to aid in the process, the injection molding set forth in FIGS. 8 and 9 is performed with the flexible diffuser membrane 210 upside-down in relation to its orientation in FIGS. 2-7. The molding parts include a bottom mold 400, a first top mold 405, a second top mold 410, and an insert piece 415. Prior to injecting any plastic, the flexible diffuser membrane 210 is placed top-down on the bottom mold 400 such that a plurality of supporting teeth 420 on the bottom mold 400 support the circumferential bead 215 of the flexible diffuser membrane 210. The thin circular sheet 270 is then placed on the flexible diffuser membrane 210. Finally, the first top mold 405, the second top mold 410, and the insert piece 415 are arranged on top of the bottom mold 400 to achieve the condition shown in FIG. 9.

Figure 10:
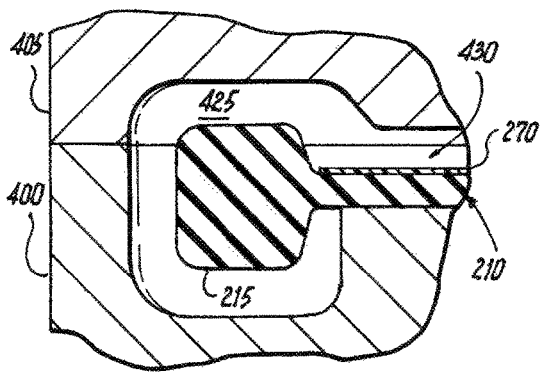
FIGS. 10 and 11 show sectional views of spaces proximate to the circumferential bead of the diffuser assembly along the planes indicated in FIG. 9 before injection of molten plastic.
Figure 11:
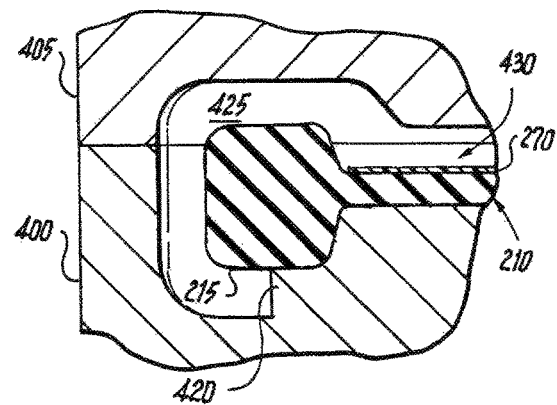

Configured in this manner, the molds 400, 405, 410 define a first space 425 for molten plastic about the circumferential bead 215 of the flexible diffuser membrane 210, which allows formation of the edge ring 225 of the diffuser body 205. At the same time, the molds 400, 405, 410 and the insert piece 415 define a second space 430 above the flexible diffuser membrane 210, which allows the formation of the circular plate 220 and the threaded mating tube 245. FIGS. 10 and 11 show sectional views of the spaces 425, 430 proximate to the circumferential bead 215 along the planes indicated in FIG. 9. From these views, it becomes clear how the supporting teeth 420 help to support the circumferential bead 215 in the space 425 intended for the formation of the edge ring 225.

Figure 12:
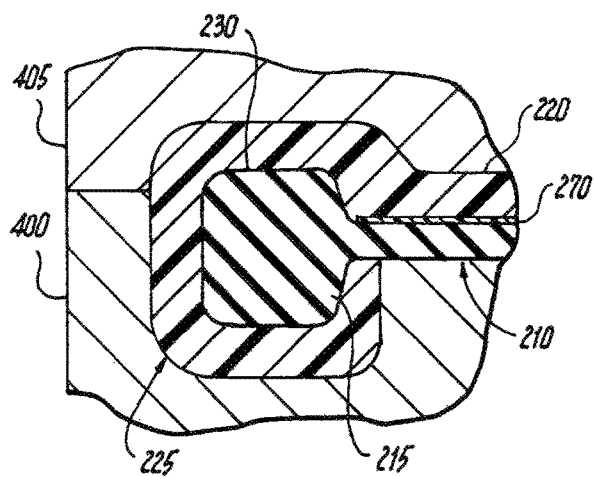
FIGS. 12 and 13 show sectional views of the same regions shown in FIGS. 10 and 11, respectively, after injection of molten plastic.
Figure 13:
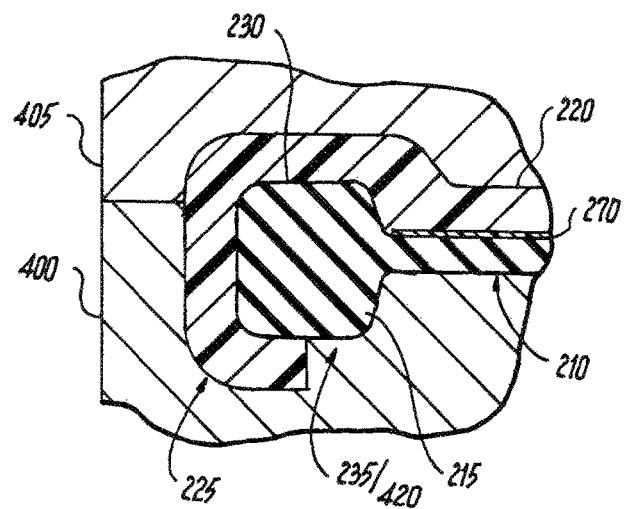

Molten plastic may be injected through injection holes 435 in the top molds 405, 410. FIGS. 12 and 13 show sectional views of the same regions shown in FIGS. 10 and 11, respectively, but after injection of the plastic forming the diffuser body 205. Where supporting teeth 420 are present (FIG. 13), one finds the plurality of slots 235 in the edge ring 225 that are so apparent in FIGS. 3 and 4, thereby explaining the source of these slots 235. Where no supporting teeth 420 are present (FIG. 12), one finds the fully encompassing regions of the edge ring 225. Because the molten plastic is able to flow directly against the circumferential bead 215 of the flexible diffuser membrane 210, one also finds that the edge ring 225 defines the inside surface 230 that conforms to an outside shape of the covered portion of the circumferential bead 215.

While forming prototypes of the above-described diffuser assembly 200, it was empirically discovered that, without the presence of the thin circular sheet 270, the just formed circular plate 220 had a tendency to fuse to the flexible diffuser membrane 210. Once so fused, the flexible diffuser membrane 210 did not perform as desired. In contrast, with the thin circular sheet 270 in place, no such fusing was observed and the diffuser assembly 200 performed properly. The thin circular sheet 270 is therefore a preferred aspect of the present design because of the manner in which it aids the manufacturing process. During the same experimentation, it was also empirically observed that the square cross-section of the circumferential bead 215 of the flexible diffuser membrane 210 seemed to allow the edge ring 225 to firmly anchor the circumferential bead 215 to the diffuser body 205 and prevent any slippage or leakage during use. This cross-sectional shape is therefore also preferred. In both cases, the term "preferred" is intended to mean favored, but not necessary to fall within the scope of the invention.

Figure 1:
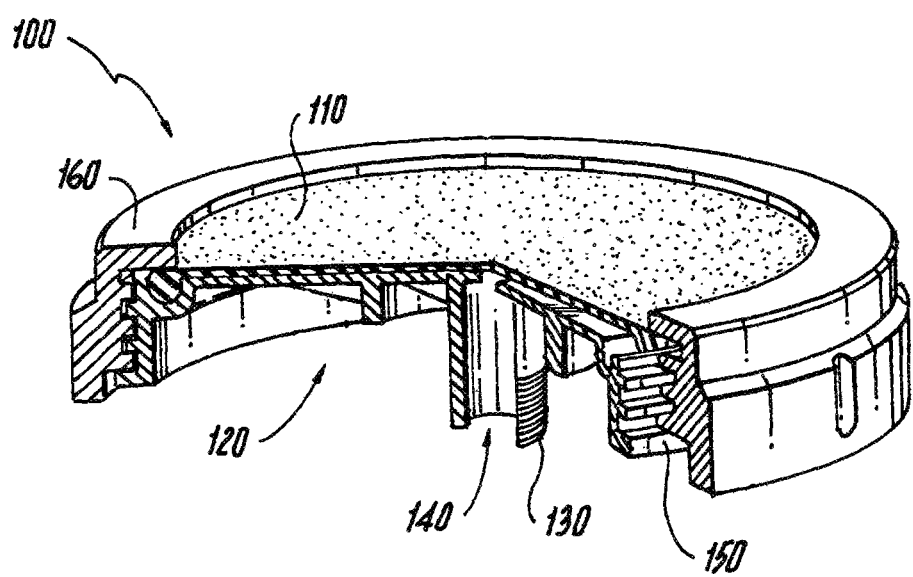
FIG. 1 shows a partially-broken side perspective view of a conventional fine bubble diffuser assembly.

The above-described diffuser assembly 200 thereby becomes a one-piece, "solid-state" diffuser assembly, meaning that it does not use a separate diffuser membrane, body, and threaded retaining ring in the manner of the conventional diffuser assembly in FIG. 1. As such, the diffuser assembly 200, and, more generally, diffuser assemblies falling within the scope of the invention, may provide several advantages over conventional technologies. For example, the diffuser assembly 200 may be utilized in the field as a disposable part. When the flexible diffuser membrane 210 ultimately becomes fouled, the entire diffuser assembly 200 is replaced by a new one. Such a replacement is a simple operation, requiring only one new part, with no diffuser disassembly, greasing, special wrenches, or significant concerns about broken parts or leaks. In addition, the diffuser assembly 200 may weigh significantly less than a diffuser assembly made of separate components because it is not necessary to utilize thick plastic to deal with stress from tightly threaded retaining parts. Lastly, it may be possible to use less costly plastic resins when forming the diffuser assembly 200 because a single diffuser body is structurally more solid than a stressed threaded retaining ring and body. In some cases, recycled plastics may be an option.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for"

performing a specified function is not to be interpreted as a "means for" or "step for" clause as specified in AIA 35 U.S.C. § 112(f). In particular, the use of "step of" in the claims herein is not intended to invoke the provisions of AIA 35 U.S.C. § 112(f).

What is claimed is:

1. A diffuser assembly comprising:
a flexible diffuser membrane defining a circumferential bead;
a diffuser body defining a circular plate underlying the flexible diffuser membrane and defining an edge ring covering a covered portion of the circumferential bead such that the circumferential bead cannot be lifted away from the diffuser body with the flexible diffuser membrane and the diffuser body intact; and
a thin sheet disposed between the circular plate and the flexible diffuser membrane;
wherein:
the edge ring is integral to the diffuser body with the edge ring and the remainder of the diffuser body formed from a continuous piece of the same plastic material; and
supply pressurized gas to the diffuser assembly is operative to expand the flexible diffuser membrane away from the thin sheet to form a gas-filled volume therebetween.

2. The diffuser assembly of claim 1, wherein the flexible diffuser membrane comprises an elastomer.

3. The diffuser assembly of claim 1, wherein the flexible diffuser membrane defines a plurality of perforations therethrough.

4. The diffuser assembly of claim 1, wherein the diffuser body comprises a thermoplastic.

5. The diffuser assembly of claim 1, wherein:
the circular plate defines an opening; and
the diffuser body defines a threaded mating tube with an inside gas passage that terminates in the opening.

6. The diffuser assembly of claim 5, wherein the flexible diffuser membrane defines an intact region overlying the opening with no perforations therethrough.

7. The diffuser assembly of claim 5, wherein the thin sheet is annular with a center hole overlying the opening.

8. The diffuser assembly of claim 1, wherein the covered portion consists of a majority of the circumferential bead.

9. The diffuser assembly of claim 1, wherein the circumferential bead is not substantially compressed by the diffuser body.

10. The diffuser assembly of claim 1, wherein the thin sheet comprises a plastic.

11. A wastewater treatment tank including a diffuser assembly comprising:
a flexible diffuser membrane defining a circumferential bead;
a diffuser body defining a circular plate underlying the flexible diffuser membrane and defining an edge ring covering a covered portion of the circumferential bead such that the circumferential bead cannot be lifted away from the diffuser body with the flexible diffuser membrane and the diffuser body intact; and
a thin sheet disposed between the circular plate and the flexible diffuser membrane;
wherein:
the edge ring is integral to the diffuser body with the edge ring and the remainder of the diffuser body formed from a continuous piece of the same plastic material; and
supplying pressurized gas to the diffuser assembly is operative to expand the flexible diffuser membrane away from the thin sheet to form a gas-filled volume therebetween.

12. The wastewater treatment tank of claim 11, further comprising a gas distribution pipe, wherein the diffuser assembly is in gaseous communication with an inside of the gas distribution pipe.

13. A method of manufacturing a diffuser assembly comprising the steps of:
receiving a flexible diffuser membrane defining a circumferential bead;
placing a thin sheet against the flexible diffuser membrane;
forming, at least in part by injection molding, a diffuser body defining a circular plate underlying the flexible diffuser membrane and defining an edge ring covering a covered portion of the circumferential bead such that the circumferential bead cannot be lifted away from the diffuser body with the flexible diffuser membrane and the diffuser body intact; and
wherein:
the step of placing a thin sheet against the flexible diffuser membrane is performed before the step of forming the diffuser body so that the thin sheet is disposed between the flexible diffuser membrane and teh circular plate after the step of forming the diffuser body;
the edge ring is integral to the diffuser body with the edge ring and the remainder of the diffuser body formed from a continuous piece of the same plastic material; and
supplying pressurized gas to the diffuser assembly is operative to expand the flexible diffuser membrane away from the thin sheet to form a gas-filled volume therebetween.

14. The method of claim 13, wherein the circumferential bead is supported by a plurality of supporting teeth during the injection molding.

15. The method of claim 14, wherein:
the edge ring defines a plurality of slots therein, each slot of the plurality of slots exposing a respective outside surface portion of the circumferential bead; and
each of the plurality of slots is positioned where a respective one of the plurality of supporting teeth was located during the injection molding.

16. The method of claim 13, wherein, during injection molding, molten plastic directly contacts the covered portion of the circumferential bead.

17. The method of claim 13, wherein the thin sheet is formed of a plastic.

18. The method of claim 13, wherein:
the circular plate defines an opening; and
the diffuser body defines a threaded mating tube with an inside gas passage that terminates in the opening.

19. A diffuser assembly formed at least in part by the steps of:
receiving a flexible diffuser membrane defining a circumferential bead; and
forming, at least in part by injection molding, a diffuser body defining a circular plate underlying the flexible diffuser membrane and defining an edge ring covering a covered portion of the circumferential bead such that the circumferential bead cannot be lifted away from the diffuser body with the flexible diffuser membrane and the diffuser body intact;

wherein:
during the injection molding, molten plastic directly contacts the covered portion of the circumferential bead; and
after the injection molding, the edge ring is integral to the diffuser body with the edge ring and the remainder of the diffuser body formed from a continuous piece of the same plastic material.

20. The diffuser assembly of claim 19, wherein the circumferential bead is supported by a plurality of supporting teeth during the injection molding.

21. The diffuser assembly of claim 20, wherein:
the edge ring defines a plurality of slots therein, each slot of the plurality of slots exposing a respective outside surface portion of the circumferential bead; and
each of the plurality of slots is positioned where a respective one of the plurality of supporting teeth was located during the injection molding.

22. The diffuser assembly of claim 19, further comprising the step of placing a thin sheet against the flexible diffuser membrane before the step of forming the diffuser body so that the thin sheet is disposed between the flexible diffuser membrane and the circular plate after the step of forming the diffuser body.

23. The diffuser assembly of claim 22, wherein the thin sheet is formed of a plastic.

24. The diffuser assembly of claim 19, wherein:
the circular plate defines an opening; and
the diffuser body defines a threaded mating tube with an inside gas passage that terminates in the opening.

25. A diffuser assembly comprising:
a flexible diffuser membrane defining a circumferential bead; and
a diffuser body defining a circular plate underlying the flexible diffuser membrane and defining an edge ring covering a covered portion of the circumferential bead such that the circumferential bead cannot be lifted away from the diffuser body with the flexible diffuser membrane and the diffuser body intact;
wherein:
the edge ring is integral to the diffuser body with the edge ring and the remainder of the diffuser body formed from a continuous piece of the same plastic material; and
the edge ring defines a plurality of slots therein, each slot of the plurality of slots exposing a respective outside surface portion of the circumferential bead.

\* \* \* \* \*